Patented Aug. 20, 1946

2,406,260

UNITED STATES PATENT OFFICE 2,406,260

POLYSULPHIDE POLYMER

Laurence L. Ryden, Midland, Mich., assignor to The Dow Chemical Company, Midland, Mich., a corporation of Michigan No Drawing. Application December 3, 1943, Serial No. 512,774

13 Claims. (Cl. 260—78)

This invention is concerned with polysulphide polymers and is particularly directed to a method for the preparation of cold-flow resistant organic polysulphide polymers and to the polysulphide polymer product so obtained.

Organic polysulphide polymers have been suggested for use and found valuable in a wide variety of applications. These materials are employed in some instances as substitutes for natural rubber and in others as distinct elastomer products differing from rubber in such a manner as to be preferable thereto. The cold-flow properties of the polysulphide polymers have greatly restricted their use. Thus these materials undergo deformation under pressure and show but a slight recovery. This prohibits their use in situations where high elasticity and resistance to flow are desirable.

A voluminous art has accumulated with respect to the preparation of organic polysulphide polymers. Rubber-like materials have been prepared by reacting aqueous alkaline polysulphides with a very wide variety of organic halides and particularly di-halo-alkanes such as ethylene chloride, propylene chloride, and other aliphatic compounds containing —$CH_2$— radicals and a multiplicity of halogen atoms. Representative of the teachings of the art is the disclosure found in United States Letters Patents Nos. 1,890,191, issued December 6, 1932; 1,923,392, issued August 22, 1933; Reissue 19,207, issued June 12, 1934; 2,142,144, issued January 3, 1939; and 2,195,380, issued March 16, 1940. Each of these patents discloses a large number of elastomer products all subject to the disadvantages as outlined above with respect to cold-flow.

It is an object of the present invention to provide a method for the production of an organic polysulphide polymer product which will be resistant to cold-flow and deformation. It is a further object to provide a such polysulphide polymer product which will have better properties of recovery than characterize known polymer products of this type. Other objects will become apparent from the following specification.

I have discovered that a resilient polymer resistant to cold-flow is obtained by a modification of the usual procedure for the preparation of organic polysulphide elastomers. This desirable result is accomplished by carrying out the condensation of the aqueous alkaline polysulphide with a mixture of (1) a halohydrin comprising two halogen atoms and at least one hydroxyl all attached to aliphatic carbon atoms and (2) other polyhalo-aliphatic compounds to form an elastomer product, and thereafter reacting such product with an alkenedioic acid or alkenedioic acid anhydride. The resulting material has good resistance to cold-flow, and in this respect more nearly resembles natural rubber than organic polysulphide polymers heretofore known.

The exact mechanics of the reaction are not understood, and it is not desired that the invention be in any way limited by theory as to how such result is accomplished. However, it seems reasonable to assume that the provision of free hydroxyl groups along the chain of the polymer as initially formed permits of coupling or cross linking upon reaction with the unsaturated polybasic acid or acid anhydride whereby a compact molecule is obtained which is resistant to deformation under pressure, a property not shared by the conventional polysulphide chain structures.

In carrying out the invention, the condensation between the aqueous alkaline polysulphide and organic reactant may be accomplished in any suitable manner, provided only that such reactants and amounts be employed as yield a product of rubbery consistency. Thus the organic reactant may be added all at once to the polysulphide solution or such addition may be portionwise with stirring to accomplish piecemeal reaction of the materials. The temperatures, concentrations, and other conditions of reaction may be regulated as required. Similarly the reaction of the polysulphide polymer with the polybasic acid or anhydride coupling agent may be accomplished in any suitable fashion. Representative conditions of reaction for the condensation and coupling or curing operations are set forth in U. S. Patent No. 2,195,380, to Joseph C. Patrick, dated March 26, 1940.

The preferred embodiment of the invention resides in the use of glyceryl-dichlorohydrin in an initial condensation with aqueous sodium polysulphide. This chlorohydrin material has given good results when employed in mixture with other aliphatic halogen compounds and particularly the lower alkylene halides. The amount of the glyceryl-dichlorohydrin employed is between about 1 and 20 mole per cent of the total organic reactant concerned. The balance of the organic reactant consists preferably of a mixture of ethylene chloride and propylene chloride, with the former predominating. When too high a proportion of glyceryl-dichlorohydrin is employed, the polymer obtained does not have rubber-like properties. When too little is used, the desired cold-flow resistant characteristic is not obtained in the final product.

The preferred coupling agent for reaction with the basic polysulphide polymer is maleic anhydride. This reactant is employed in the amount of at least 5 per cent and preferably not to exceed 40 per cent by weight of the glyceryl-dichlorohydrin.

One mode of operation which has been found particularly satisfactory consists of reacting a molecular excess of $Na_2S_{1.5-4}$ with 1 mole of a mixture of glyceryl-dichlorohydrin and lower alkylene chlorides, the former being present in the amount of from about 5 to 20 mole per cent. The reaction is carried out by dissolving the polysulphide in water and adding the organic reactants portionwise to the polysulphide solution with stirring at between 65° and 80° C. The mixture is warmed and stirred at 70°–80° C. for an additional hour, and thereafter subjected to treatment with an aqueous solution of 0.2 mole of a high ranking sodium polysulphide ($Na_2S_{4.5}$ or higher) at a temperature of between 85° and 110° C. The resultant latex is washed with water, coagulated with dilute acid, separated, and dried.

While any suitable means may be employed to react this initial elastomer product with the acid or acid anhydride coupling agent, the preferred method consists of mixing the product with the acid or anhydride on the rolls of a conventional rubber compounding mill. This is conveniently accomplished by first modifying the polysulphide polymer product with additaments such as zinc oxide, carbon black, and/or other fillers, stabilizers, and the like, and then mixing and milling the coupling agent therewith. During this and the subsequent step of curing at temperatures above 250° F., a reaction takes place between the crude polymer product and the coupling agent whereby the desired cold-flow resistant and resilient polymer material is produced.

The following examples illustrate the practice of the invention but are not to be construed as limiting.

Example 1

A mixture of 7 parts by weight (0.06 mole) of propylene chloride, 75 parts (0.76 mole) of ethylene chloride, and 12 parts (0.09 mole) of glyceryl-dichlorohydrin was added portionwise and with stirring over a period of one hour to a dispersion in 500 parts of water of 94 parts by weight (1.0 mole) of $Na_2S_{1.5}$, 2 parts of sodium-alkyl-naphthalene-sulphonic acid (Nekal BX), and 6 parts of freshly precipitated magnesium hydroxide. The temperature of the reaction mixture was maintained at about 70° C. during the addition. Stirring and warming of the mixture at 70°–80° C. was continued for one hour. A solution of 38 parts by weight of $Na_2S_{4.5}$ in 100 parts of water was then added to the mixture and stirring continued for an additional hour, the temperature being maintained at about 90° C. The resultant latex was washed several times with water and coagulated with dilute sulphuric acid. The solid product of reaction was separated from the liquid components of the mixture and dried to obtain 60 parts by weight of elastomer.

The dried elastomer was then compounded in the following basic mixture:

| Material: | Parts by weight |
| --- | --- |
| Elastomer | 100 |
| Zinc oxide | 10 |
| Carbon black | 60 |
| Stearic acid | 0.5 |
| Mercaptobenzothiazole | 2.0 |
| Diphenylguanidine | 0.1 |

This composition was then reacted with 5 parts by weight of maleic anhydride by cold mixing on the rolls of a conventional rubber-compounding mill and subsequent curing of the mixture for 15 minutes at 298° F. to obtain the desired rubber-like polymer product.

A similar mixing and curing operation was carried out with an additional quantity of the dried elastomer in which only one part by weight of maleic anhydride was employed. Here also there was obtained a rubber-like material.

Cylindrical plugs ½ inch high by ½ inch in diameter were prepared from the basic elastomer mixture and also from the basic composition in mixture with 5 parts and one part of maleic anhydride. The plugs were then cured at 298° F. for 15 minutes. These test pieces were employed to determine the resistance to cold-flow of the several mixtures. In this operation each plug was compressed to 75 per cent of its original height for one hour at a temperautre of 70° C. and the extent of recovery of each determined upon the release of pressure. From an initial compression to 0.375 inch, the plug made up from the unmodified elastomer composition recovered only 2 per cent to a height of 0.377 inch. The plug prepared from the elastomer reacted with one part of maleic anhydride recovered to the extent of 33 per cent to 0.421 inch, and the plug made up from the elastomer reacted with 5 parts of maleic anhydride recovered to the extent of 62 per cent to a height of 0.453 inch. A control plug prepared from a basic composition containing an elastomer obtained by the reaction of sodium polysulphide with the alkylene halides in the absence of glyceryl-dichlorohydrin had 0 per cent recovery.

Example 2

In a similar fashion a mixture of 6.9 parts by weight (0.06 mole) of propylene chloride, 69 parts (0.7 mole) of ethylene chloride, and 22 parts (0.17 mole) of glyceryl-dichlorohydrin was reacted with a mixture of 94 parts by weight (1 mole) of $Na_2S_{1.5}$, 2 parts of a sodium salt of sulphonated ethyl oleate (Igeponap), 6 parts of freshly precipitated magnesium hydroxide, and 500 parts of water. The initial reaction, subsequent treatment with high ranking sodium polysulphide ($Na_2S_{4.5}$), coagulation, and separation all were substantially as described in Example 1 with therecovery of a substantial yield of dried elastomer. 100 parts of this elastomer were compounded as follows:

| Material: | Parts by weight |
| --- | --- |
| Elastomer | 100 |
| Carbon black | 60 |
| Stearic acid | 0.5 |
| Mercaptobenzothiazole | 2.0 |
| Diphenylguanidine | 0.1 |

This basic composition was mixed with 5 parts of maleic anhydride and cured at 274° F. for 15 minutes to obtain a rubber-like product.

Cylindrical plugs were made up from the basic elastomer mixture and from such mixture following modification with maleic anhydride. These plugs were cured at 274° F. for 15 minutes and subjected to compression as previously described. The plug made up from the basic composition showed a 2 percent recovery to a height 0.377 inch. The plug from the modified elastomer product recovered to a height of 0.465 inch, or 72 per cent.

While the foregoing examples have been directed specifically to operations in which the cross-linking or coupling is accomplished with maleic anhydride, it is to be understood that equivalents therefor may also be employed. Representative of the acids and anhydrides potentially adapted for such use are maleic acid, citraconic acid and anhydride, glutaconic acid and anhydride, pyrocinchoninic acid anhydride, ethyl maleic acid and anhydride, methyl ethyl maleic acid and anhydride, xeronic acid and anhydride, methyl glutaconic acid and anhydride, etc. Also other polyhalo-aliphatic compounds may be substituted, wholly or in part, for the ethylene chloride and propylene chloride disclosed. Representative of such materials are butylene chloride, B,B'-dichlorodiethyl ether, 1.3-trimethylene chloride, dichlorobutylene, etc.

I claim:

1. A method for the preparation of cold-flow resistant rubber-like organic polysulphide polymers, which includes the steps of condensing a molecular excess of an alkaline polysulphide with a mixture of (1) from 1 to 20 mole per cent of a halohydrin comprising two halogen atoms and at least one hydroxyl all attached to aliphatic carbon atoms in (2) a polyhalo-aliphatic compound containing at least one —CH$_2$ radical to form an elastomer product, and thereafter compounding such product with one of the group consisting of alkenedioic acids and anhydrides in the amount of from about 5 to about 40 per cent by weight of the halohydrin employed.

2. A method for the preparation of cold-flow resistant rubber-like organic polysulphide polymers, which includes the steps of condensing a molecular excess of an alkali-metal polysulphide with a mixture of (1) from 1 to 20 mole per cent of glyceryl-dichlorohydrin in (2) a lower alkylene halide to form an elastomer product, and thereafter compounding such product with one of the group consisting of alkenedioic acids and anhydrides in the amount of from about 5 to 40 per cent by weight of glyceryl-dichlorohydrin employed.

3. A method for the preparation of cold-flow resistant rubber-like organic polysulphide polymers, which includes the steps of condensing a molecular excess of sodium polysulphide with a mixture of (1) from 1 to 20 mole per cent of glyceryl-dichlorohydrin in (2) an alkylene halide product consisting of about 90 per cent ethylene chloride and about 10 per cent propylene chloride to form an elastomer product, and thereafter compounding such product with an alkenedioic acid anhydride in the amount of from about 5 to 40 per cent by weight of glyceryl-dichlorohydrin employed.

4. A method for the preparation of cold-flow resistant rubber-like organic polysulphide polymers, which includes the steps of condensing a molecular excess of sodium polysulphide with a mixture of (1) from 1 to 20 mole per cent of glyceryl-dichlorohydrin in (2) an alkylene halide product consisting of about 90 per cent ethylene chloride and about 10 per cent propylene chloride to form an elastomer product, and thereafter compounding such product with maleic acid anhydride in the amount of from about 5 to 40 per cent by weight of glyceryl-dichlorohydrin employed.

5. A method for the preparation of cold-flow resistant rubber-like organic polysulphide polymers, which includes the steps of condensing a molecular excess of sodium polysulphide with a mixture of (1) from 5 to 20 mole per cent of glyceryl-dichlorohydrin in (2) an alkylene halide product consisting of about 90 per cent ethylene chloride and about 10 per cent propylene chloride to form an elastomer product, mixing this elastomer with carbon black and vulcanizing accelerators, mixing with such elastomer composition maleic anhydride in the amount of from about 5 to about 40 per cent by weight of the glyceryl-dichlorohydrin employed, and thereafter heating the mixture to obtain the desired rubber-like composition.

6. A cold-flow resistant rubber-like organic polysulphide polymer product prepared according to the process of claim 5.

7. A method for the preparation of cold-flow resistant rubber-like organic polysulphide polymers, which includes the steps of condensing a molecular excess of an alkaline polysulphide with a mixture of (1) from 1 to 20 mole per cent of a halohydrin comprising two halogen atoms and at least one hydroxyl all attached to aliphatic carbon atoms in (2) a polyhalo-aliphatic compound containing at least one —CH$_2$— radical, to form an elastomer product, thereafter compounding such product with one of the group consisting of alkenedioic acids and anhydrides in the amount of from about 5 to about 40 per cent of the halohydrin employed, and heating the mixture to obtain the desired rubber-like composition.

8. A method for the preparation of cold-flow resistant rubber-like organic polysulphide polymers, which includes the steps of condensing a molecular excess of an alkali-metal polysulphide with a mixture of (1) from 1 to 20 mole per cent of glyceryl-dichlorohydrin in (2) a lower alkylene halide to form an elastomer product, thereafter compounding such product with one of the group consisting of alkenedioic acids and anhydrides in the amount of from about 5 to about 40 per cent by weight of the glyceryl-dichlorohydrin employed, and heating the mixture to obtain the desired rubber-like composition.

9. A method for the preparation of cold-flow resistant rubber-like organic polysulphide polymers, which includes the steps of condensing a molecular excess of sodium polysulphide with a mixture of (1) from 1 to 20 mole per cent of glyceryldichlorohydrin in (2) an alkylene halide product consisting of about 90 per cent ethylene chloride and about 10 per cent propylene chloride to form an elastomer product, thereafter compounding such product with an alkenedioic acid anhydride in the amount of from about 5 to about 40 per cent by weight of the glyceryl-dichlorohydrin employed, and heating the mixture to obtain the desired rubber-like composition.

10. A method for the preparation of cold-flow resistant rubber-like organic polysulphide polymers, which includes the steps of condensing a molecular excess of sodium polysulphide with a mixture of (1) from 1 to 20 mole per cent of glyceryldichlorohydrin in (2) an alkylene halide product consisting of about 90 per cent ethylene chloride and about 10 per cent propylene chloride to form an elastomer product, and thereafter compounding such product with maleic acid anhydride in the amount of from about 5 to about 40 per cent by weight of the glyceryl-dichlorohydrin employed, and heating the mixture to obtain the desired rubber-like composition.

11. A cold-flow resistant rubber-like organic polysulphide polymer product prepared according to the process of claim 7.

12. A cold-flow resistant rubber-like organic polysulphide polymer product prepared according to the process of claim 9.

13. An uncured organic polysulphide elastomer product prepared according to the process of claim 1.

LAURENCE L. RYDEN.